(12) United States Patent
Boersma

(10) Patent No.: US 8,719,871 B2
(45) Date of Patent: May 6, 2014

(54) METHOD AND APPARATUS FOR UTILIZING DYNAMIC BANDWIDTH ALLOCATION FOR RECORDING CONTENT

(75) Inventor: Frank Leroy Boersma, Easton, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 429 days.

(21) Appl. No.: 12/574,355

(22) Filed: Oct. 6, 2009

(65) Prior Publication Data

US 2011/0083154 A1    Apr. 7, 2011

(51) Int. Cl.
*H04N 7/173* (2011.01)

(52) U.S. Cl.
USPC ............. 725/58; 725/95; 725/96; 725/97; 725/110; 386/291

(58) Field of Classification Search
USPC .................. 725/93–97; 386/291–299
See application file for complete search history.

(56) References Cited

U.S. PATENT DOCUMENTS

| | | | |
|---|---|---|---|
| 7,526,788 B2* | 4/2009 | Rodriguez | 725/86 |
| 2002/0095684 A1* | 7/2002 | St. John et al. | 725/95 |
| 2002/0174430 A1* | 11/2002 | Ellis et al. | 725/46 |
| 2005/0081244 A1* | 4/2005 | Barrett et al. | 725/97 |
| 2006/0031883 A1* | 2/2006 | Ellis et al. | 725/58 |
| 2007/0076728 A1* | 4/2007 | Rieger et al. | 370/401 |
| 2009/0100487 A1* | 4/2009 | Chang et al. | 725/111 |
| 2009/0119728 A1* | 5/2009 | Broberg | 725/114 |
| 2010/0186025 A1* | 7/2010 | Thomas et al. | 725/5 |

* cited by examiner

*Primary Examiner* — Vivek Srivastava
*Assistant Examiner* — Carmine Malangone

(57) ABSTRACT

An approach is provided for utilizing dynamic bandwidth allocation for recording content. A recording manager generates a request for bandwidth for a future recording of a programming content to be delivered to a set-top box. The recording manager then receives a response indicating a dynamic bandwidth allocation for the future recording and schedules the future recording of the programming content based on the dynamic bandwidth allocation.

6 Claims, 9 Drawing Sheets

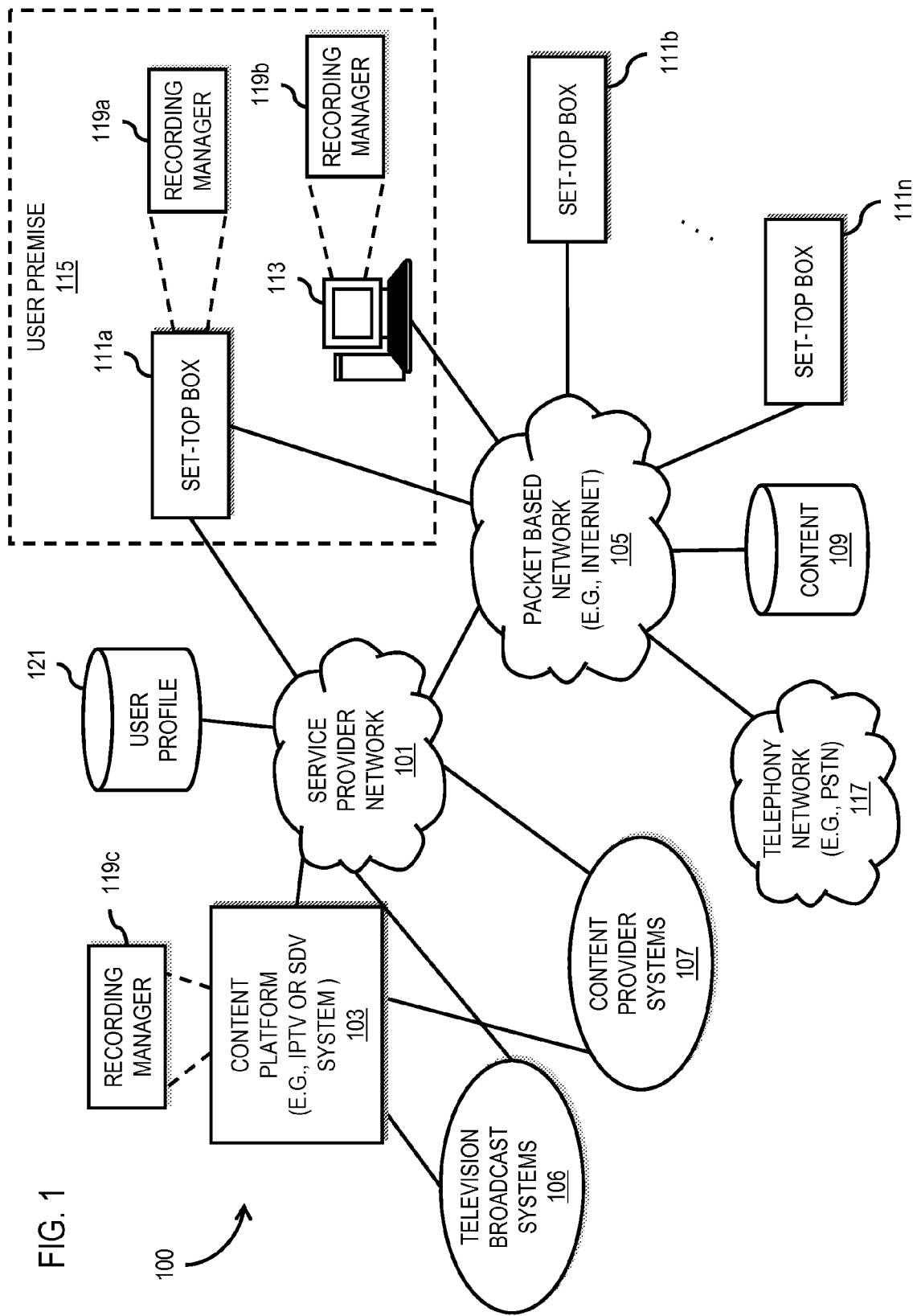

US 8,719,871 B2

METHOD AND APPARATUS FOR UTILIZING DYNAMIC BANDWIDTH ALLOCATION FOR RECORDING CONTENT

BACKGROUND INFORMATION

With the advent of computers, interactive electronic communications, and the Internet, as well as advances in the digital realm of consumer information, has come a reinvention of conventional entertainment and communication services to enhance programming, recording, and viewing of multimedia, such as broadcast television programs. It is not uncommon for consumers to have access to hundreds, if not thousands, of media programs from a multitude of sources such as broadcast television, on-demand programming, and other third party content providers available through the Internet. In addition, consumers are provided with great flexibility in the times they actually will view the content, as made possible with digital video recorder (DVR) technology, for instance. Such volume of programming can place a tremendous strain on network resources, namely bandwidth. Moreover, the flexibility in viewing times poses an additional challenge to properly designing network capacity for the traffic loads and patterns. Traditionally, the infrastructure for content delivery, particularly broadcast content, has been largely engineered using predetermined, static bandwidth. However, this static approach can result in wasted capacity, if, for example, the demand for the programs has been overestimated. Conversely, if there is insufficient capacity, the service provider will not be able to satisfy the demand for certain content, and thus, can potentially suffer the lost of revenue.

Therefore, there is a need for an approach for efficiently coordinating the allocation of bandwidth for recording of content.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 1 is a diagram of a system capable of utilizing dynamic bandwidth allocation for a future recording of programming content, according to an exemplary embodiment;

DESCRIPTION OF THE PREFERRED EMBODIMENT

Figure 2A:
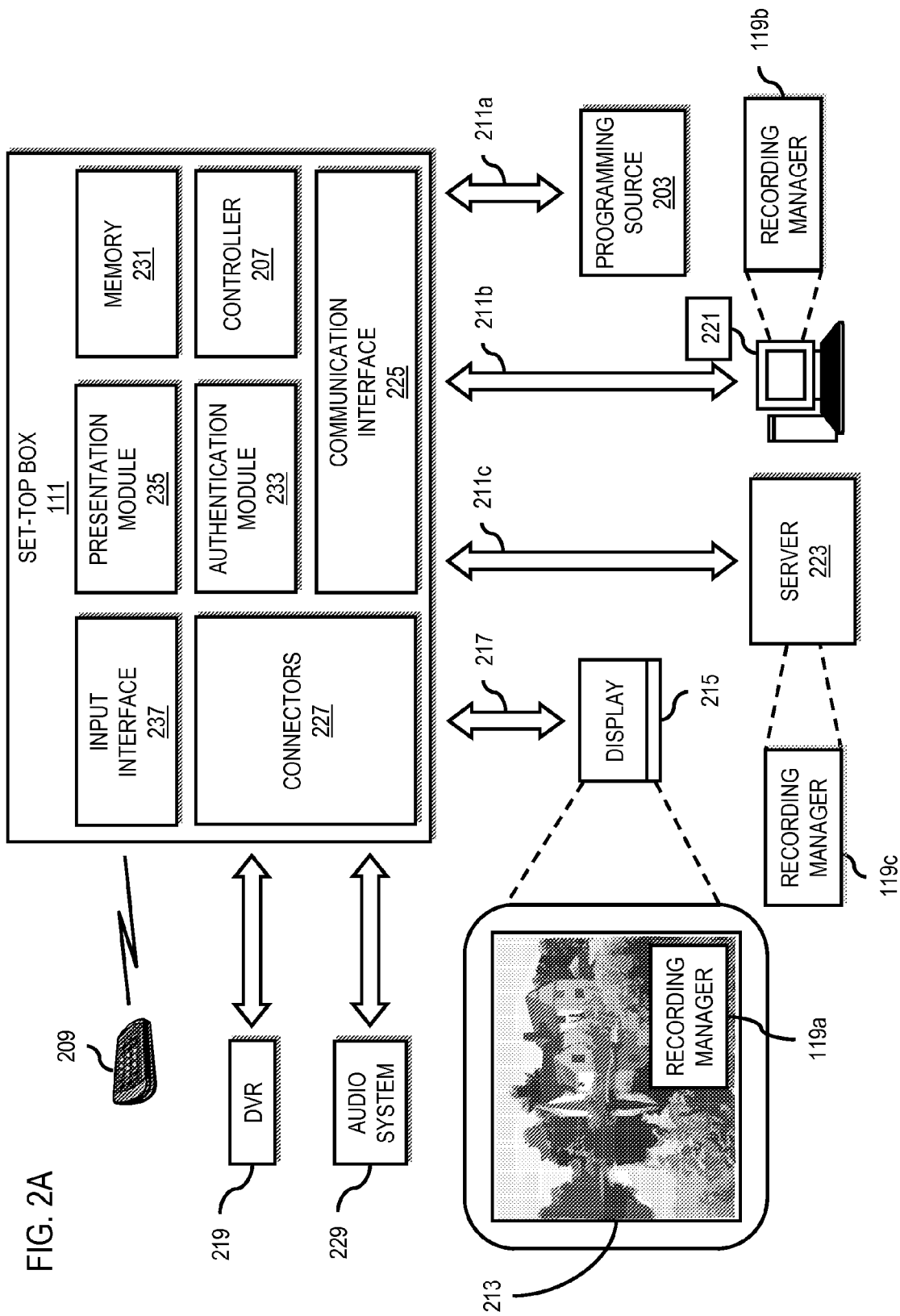
FIG. 2A is a diagram of a set-top box configured to utilize dynamic bandwidth allocation for a future recording of programming content, according to an exemplary embodiment.

A preferred apparatus, method, and system for utilizing dynamic bandwidth allocations for recording video programs are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB) and wired networks, it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), wireless device (e.g., smart phone), and/or a personal computer (PC), as well as wireless networks.

FIG. 1 is a diagram of a system capable of utilizing dynamic bandwidth allocation for a future recording of programming content, according to an exemplary embodiment. Media content providers can deploy dynamic bandwidth allocation technologies (e.g., Internet Protocol Television (IPTV), switched digital video (SDV), etc.) to increase the potential number and variety of programming content (e.g., media content, video content, audio content, etc.) that they can provide to consumers using existing network capacities. However, there are significant challenges associated with using these dynamic bandwidth allocation technologies in environments where consumers can record or schedule the recording of media (e.g., time-shifting programs) for later viewing.

Historically, the vast majority of service providers use linear broadcast technology with preallocated bandwidth for each programming channel offered to consumers. However, because of the limited spectrum (e.g., network capacity, bandwidth) available using linear broadcast, a service provider can only transmit a fixed number of channels in that spectrum. By way of example, the exact number of channels is determined by the amount of spectrum available and the portion of which is dedicated to each channel. This spectrum is, for instance, divided into quadrature amplitude modulation (QAM) carrier channels. Each QAM carrier channel can support a specific number of programming channels (e.g., television channels) based upon the type of signal being delivered. For example, a QAM carrier channel can typically support 10 standard definition (SD) programming channels, two high definition (HD) channels, or a combination thereof. Based on this example capacity, a linear broadcast network with a typical 126 QAM carrier channels can support approximately 1,260 SD digital programming channels, 254 HD digital programming channels, or a combination thereof. In most linear broadcast networks there are a combination of analog, SD digital, and HD digital programming channels, therefore the exact number of channels offered varies by service provider network design.

As media content providers attempt to become more competitive in the market place by, for instance, offering more HD programming, on-demand content, and/or more programming channels in general, the limited capacity of linear broadcast networks becomes a bigger challenge. Accordingly, media content providers are moving from the linear broadcast network approach to an approach based on dynamic bandwidth allocation technologies. For example, dynamic bandwidth allocation technologies (e.g., IPTV, SDV) do not employ preallocated spectrum that is dedicated to each offered programming channel. Instead, these technologies provide additional capacity by dynamically allocating the spectrum (e.g., bandwidth) based upon the actual channels being watched by the provider's customers at a given time. In other words, under dynamic bandwidth allocation, the media content provider's network will only allocate spectrum to a programming channel only if a request is submitted to the network for that channel. This approach optimizes the utilization of available network bandwidth by only transmitting programming channels that customers are currently watching.

In addition, the dynamic bandwidth allocation approach enables media content providers to offer virtually an unlimited number of channels to customers. However, there is still nonetheless a fixed number of unique programming channels (e.g., the same capacity discussed above with respect to a linear broadcast network) that can be delivered simultaneously to customers across a media content provider's network. As a result, the potential exists in a network using dynamic bandwidth allocation that a customer's request to view a programming channel will be denied if there is no remaining bandwidth to support the request and no other customer is already receiving the programming channel.

At the same time, media content providers commonly offer a feature for recording or scheduling the recording of media content over the providers' networks. By way of example, this feature is commercially known as a digital video recorder (DVR) or a personal video recorder (PVR). This feature enables customers to schedule the recording of media content (e.g., television programs) available from their service providers on a set-top box (STB) with a hard disk drive so that the customer may watch the media content at a future time of their choosing. However, potential problems exist when using the DVR feature in networks that employ dynamic bandwidth allocation technology such as IPTV and/or SDV. For example, a customer schedules a DVR to record a program while the customer is away on vacation. At the scheduled time, the DVR attempts to request or tune to the corresponding channel to record the program and finds that there is no available network bandwidth to support the recording. As a result, the DVR would not be able to receive the channel and record the requested program. When the customer returns, the customer will find that the DVR has not recorded the requested program. This would result in a less than satisfying customer experience and potentially an increase in dissatisfaction with and complaints to the media content provider.

To address this problem, system 100 of FIG. 1 enables a customer to request and reserve a bandwidth allocation for recording programs provided over channels using dynamic bandwidth allocation. More specifically, the system 100 introduces the capability to dynamically allocate bandwidth in advance for transmitting future programming (e.g., video content, broadcast television programming, on-demand programming, pay-per-view programming, Internet content, etc.). In this way, the customer can be sure that the bandwidth will be available to support the scheduled recording of a program at the scheduled channel, date, and time; thereby avoiding potential missed recordings because of lack of bandwidth. Moreover, if the bandwidth is not available to support the scheduled recording, the system 100 can suggest alternate channels, dates, and/or times for the requested media content available over, for instance, the service provider network 101.

It is contemplated that system 100 may embody many forms and include multiple and/or alternative components and facilities. As shown in FIG. 1, a content platform 103 operates over the service provider network 101 (e.g., fiber optic network, cable network, satellite network, etc.) to provide a programming content service that, for instance, integrates the television medium (e.g., television broadcast systems 106 and content provider systems 107) with that of the telecommunications, computing, and media environments (e.g., content repository 109), thereby broadening the scope of devices, sources, and programming content available to individuals for viewing and/or recording. Furthermore, the system 100 can employ dynamic bandwidth allocation technology (e.g., IPTV and/or switched digital video) to optimize the bandwidth available for transmitting the array of programming content offered over the service provider network 101. In other words, the content platform 103 dynamically allocates available spectrum (e.g., bandwidth) to one or more of its programming channels when the content platform 103 receives a request for the one or more programming channels. It is contemplated that the content platform 103 may transmit all or only some of its programming channels using dynamic bandwidth allocation technology. For example, a certain portion of the bandwidth available over the service provider network 101 may be dedicated for traditional linear broadcasting, whereby a programming channel is preallocated bandwidth, while the remaining portion may be allocated used dynamic bandwidth allocation. In this way, the content platform 103 may, for instance, make more popular programming channels available using dedicated bandwidth allocation and less popular programming channels available using dynamic bandwidth allocation.

Users of the system 100 can then access the programming content of the content platform 103 via, for instance, user equipment (e.g., STBs 111a-111n and/or user terminal 113) located at user premise 115. In one embodiment, the STB 111 enables reception and recording of programming content accessible over traditional transmission systems (e.g., broadcast, cable, satellite, fiber optic cable) as well as over a data network (e.g., packet-based network 105). For example, the STB 111 may record a program immediately or schedule recording of a program at a future date and time. In addition, the STB 111 includes circuitry or a similar component for receiving programming transmitted using dynamic bandwidth allocation technology. To enable recording of dynamically allocated programming channels and avoid potential network 101 capacity issues, the STB 111 can request a bandwidth allocation (e.g., a bandwidth "reservation") from the content platform 103 to ensure that the bandwidth for recording a particular program will be available for the selected programming channel at the scheduled date and time. As shown in FIG. 1, the system 100 also includes a telephony network 117 with connectivity to the service provider network 101 to provide access to programming content. More specifically, in some embodiments, the content platform 103 can transmit programming content and/or communicate with the STB 111 over the telephony network 117.

In a typical scenario, an individual (e.g., a subscriber of the content platform 103) may schedule, on the STB 111a, a recording of programming content that is provided over the service provider network 101 using dynamic bandwidth allocation. By way of example, if the content platform 103 determines that the bandwidth is available to support the recording, the content platform 103 can allocate or reserve bandwidth to support the recording at the scheduled time. This reservation, for instance, ensures that bandwidth will be available to transmit the content to the STB 111a at the scheduled date and time.

In one embodiment, the content may be delivered or transmitted over any appropriate mechanism including delivery via in-band adjacent-channels to conventional video broadcasting channels, such as multicast (e.g., live television) or unicast (e.g., stored video) streams. Other implementations may provide programming content on a sideband, in the vertical blanking interval, as a sub-channel, or using out-of-band signals, as well as any other suitable transmission technique. In this regard, the content platform 103 may transmit the requested programming content over any number of analog or digital channels (e.g., dynamically allocated channels or pre-allocated channels) offered to subscribers at any suitable frequency or rate (e.g., continuously, periodically, on-demand, etc.).

In one embodiment, a recording manager is executed at the STB 111a (e.g., recording manager 119a), the terminal 113 (e.g., recording manager 119b, the content platform 103 (e.g., recording manager 119c), and/or any other component (e.g., STB 111b-111n) with connectivity to the service provider network 101. The recording manager 119, for instance, coordinates the request from, e.g., the STBs 111a-111n or the terminal 113, for bandwidth allocations to support recordings of programming content and the corresponding processing and grant of the allocation request by the content platform 103. For example, the recording manager 119a effectively and intuitively receives a request to recording a program, determines whether the program is dynamically allocated, initiates a request to the content platform 103 to allocate or reserve bandwidth if the program is dynamically allocated, and schedules the recording based on the response from the content platform 103. When executed on the content platform 103, the recording manager 119c receives the request form bandwidth allocation to support a recording, determines whether bandwidth is available at the requested date and time, and allocates the bandwidth according to the determination.

With respect to the system 100, programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the content platform 103 may provide (in addition to the provider's own programming content) content obtained from other sources, such as one or more television broadcast systems 106, one or more third-party content provider systems 107, or content residing in a repository 109, as well as content available via one or more packet-based networks 105 or telephony networks 107, etc.

In another embodiment, the content platform 103 can provide content that is retrieved over the packet-based network 105, as well as content transmitted using conventional media streams. For instance, the content platform 103 may provide "virtual channels" to content traditionally limited to host sites, such as end user originated content uploaded to audio, video, and/or pictographic sharing sites. Additionally, the programming content may include streamed audio and/or video from conventional broadcast providers. It is noted that programming content can be any type of information provided from any source having connectivity to system 100. In this way, the STBs 111a-111n have access to an even greater variety of content for recording.

In another embodiment, the recording managers 119a-119c may be executable, for example, as one or more user interfaces capable of local implementation on an STB (e.g., STBs 111a-111n) or on the terminal 113, such as a computer, telephony device, mobile device, or other like mechanism. Thus, exemplary embodiments of recording managers 119a-119c may be provided through navigation shell applications, e.g., menu applications having options corresponding to different functions. By way of example, computer devices may include desktop computers, notebook computers, servers, terminal workstations, gaming systems, customized hardware, or other equivalent apparatus. Telephony devices may comprise plain-old-telephones, wireless telephones, cellular telephones, satellite telephones, voice over internet protocol telephones, and the like. Mobile devices may include personal digital assistants (PDA), pocket personal computers, smart phones, tablets, handsets, portable gaming systems, and customized hardware, as well as other mobile technologies capable transmitting data. Moreover, STBs 111a-111n may be used alone or in combination with one or more end terminal(s) 113 and the content platform 103 to implement various exemplary embodiments.

The content platform 103, STBs 111a-111n, and/or terminal 113 can communicate using the packet-based network 105 and/or the telephony network 117. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 111a-111n to various sources of media content. Although depicted in FIG. 1 as separate networks, packet-based network 105 and/or telephony network 117 may be completely or partially contained within service provider network 101. For example, service provider network 101 may include facilities to provide for transport of packet-based and/or telephony communications.

By way of example, STB 111a-111n, as well as terminal 113, can remotely access one or more servers (not shown), via a communication interface configured to execute multiple instances of recording manager 119. That is, recording manager 119 may be provided in a distributed fashion using, for instance, client-server architectures, such as implemented by enterprise application service providers (ASP). It is noted that ASP models (and other like architectures) offer system scalability in terms of administrative scalability, geographic scalability, and/or load scalability. Thus, distributed environments are attractive modes for disseminating system 100 functionality to a broad spectrum of users and devices.

For example, the content platform 103 can provide the functions of the recording manager 119 as an "online" system capable of communicating with one or more third-party web servers (not illustrated), content repositories (e.g., repository 109), or equivalent facilities, to provide users various avenues to locate, specify, receive, share, and/or record programming content that is accessible over the service provider network 101. For example, exemplary embodiments of the recording manager may comprise hypertext markup language (HTML) user interfaces or JAVA™ applets stored on the content platform 103 and accessed via world-wide-web pages. These interfaces are particularly useful in extending system 100 functionality to devices having limited resources (e.g., PDAs, handsets, thin-clients, etc.).

In the example of FIG. 1, STBs 111a-111n are located at one or more user premises (e.g., user premise 113), and geospatially associated with one or more regions. STBs 111a-111n may be configured to communicate with and receive signals and/or data streams from the content platform 103 (or other transmission facility) in response to processes of one or more recording managers 119a-119c. These signals include bandwidth allocation and information related to recording programming content retrieved over a network (e.g., service provider network 101, packet-based network 105, and/or telephony network 117), as well as conventional video broadcast content.

Content platform 103 can include one or more programming content servers (not illustrated) and/or data repositories (not shown). As shown, the content platform 103 can access a user profile repository 121, the content repository 109, the television broadcast systems 106, or the content provider systems 107 directly or via one or more service provider networks 101 and/or packet-based networks 105. In one embodiment, the user profile repository 121 stores user settings, preferences, and configuration information for the recording manager 119. Further, service provider network 101 may include a system administrator (not shown) for operational and management functions to deploy the recording manager service using, for instance, an IPTV system, SDV system, or other systems using dynamic bandwidth allocation technologies. In this manner, STBs 111a-111n can utilize any suitable technology to draw, receive, transmit, and/or record media content from/to the content platform 103 or other content source/sink. A more detailed explanation of an exemplary STB is provided with respect to FIG. 2.

In various embodiments, the content platform 103 operates over the service provider network 101, which may include one or more video and/or audio processing modules (not shown) for acquiring and transmitting programming content from the content platform 103, the television broadcast systems 106, or the third-party content provider systems 107 over one or more of the networks 101, 105, 117, to particular STBs 111a-111n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with programming guide creation and related content streaming services such that only authorized users are able to access personalized programming guides and experience content reference therein.

Accordingly, system 100 may include an authentication module (not shown) configured to perform authorization/authentication services and determine whether users or content sources are indeed subscribers to, or providers of, the personalized programming guide service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., programming content streaming instances). Data packets, such as cookies, may be utilized for this purpose. Thus, once an STB 111 or content source is authenticated, connections between the STB 111 and the content sources may be established directly or through the content platform 103.

In certain embodiments, authentication procedures on a first device (e.g., STB 111a) may identify and authenticate a second device (e.g., terminal 113) communicatively coupled to, or associated with, the first device. Further, the authentication module may grant users the right to receive and/or record programming content from multiple system 100 sources by revoking existing sets of digital certificates associated with a particular provider, and issuing new sets of digital certificates mapped to a second provider. In this regard, an STB (e.g., STB 111a) may receive or record new programming content from a second source, whereas the previous session may be automatically closed when the "old" or prior certificates associated with the first source are revoked. This enables users to initiate secure sessions at any given STB 111a-111n (or end terminal 113) linked to system 100, whether or not the STB (or end terminal) belongs to that individual user. It is additionally contemplated that multiple rights sessions may exist concurrently.

In particular embodiments, the content platform 103 may comprise an IPTV system or and SDV system configured to support the transmission of television video programs from the broadcast systems 106 as well as other content, such as content from the various third-party sources (e.g., content provider systems 107) utilizing dynamic bandwidth allocation technology over internet protocol (IP). That is, the content platform 103 may deliver programming content, signals and/or streams, including programming content accessible over the data network 105, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming content (e.g., via dynamic bandwidth allocation technology). Delivery of video content, by way of example, may be through a multicast from the content platform 103 to the STBs 111a-111n. Any individual STB 111 may tune to and/or record a particular content source by simply joining a multicast (or unicast) of the media content, utilizing an IP group membership protocol (IGMP). For instance, the IGMP v2 protocol may be employed for joining STBs 111a-111n to new multicast (or unicast) groups. Such a manner of content delivery avoids the need for expensive tuners to view and/or record media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

An STB (e.g., STB 111*a*) may integrate all the functions of an IPTV system, SDV system, or similar system, as well as combine the program recording functions of the various online or off-line environments. It is contemplated that the recording and bandwidth allocation functions, as described herein, may be extended to users with a presence on the Internet. In alternative embodiments, the services of system 100 could be extended to users having an end terminal (not shown), such as a plain old telephone service (POTS) device, connected to the telephony network 111. While system 100 is illustrated in FIG. 1, the exemplary components are not intended to be limiting, and indeed, additional or alternative components and/or implementations may be utilized.

In one embodiment, the recording manager service is a managed service, whereby a service provider operates the recording manager 119 and system 100 to serve one or more subscribers.

FIG. 2A is a diagram of a set-top box configured to utilize dynamic bandwidth allocation for a future recording of programming content, according to an exemplary embodiment. The STB 111 may comprise any suitable technology to request a bandwidth allocation or reservation for recording programming content (e.g., programming content schedule for transmission at a future time) from a media source 203, such as the content platform 103 of FIG. 1. The content streams include, for instance, responses from the content platform 103 regarding the availability of bandwidth to support the requested recording. If bandwidth is available and the scheduled date and time for the allocation have arrived, the content streams also include the scheduled programming content retrieved over the service provider network 101, in response to commands from one or more recording manager application(s) 119*a*-119*c*, for presentation via the STB 111. The STB 111 may then initiate recording of the content stream for later playback or viewing by the user.

In some embodiments, the STB 111 also receives input from the user for cancelling previously scheduled recordings. In this case, the STB 111 can notify the content platform 103 that the STB 111 no longer needs the bandwidth allocation corresponding to the cancelled recording. Accordingly, the content platform 103 can determine whether to deallocate the bandwidth and make the previously allocated bandwidth available for transmitting other dynamically allocated programming content. By way of example, the content platform 103 can select whether to deallocate the bandwidth by determining if another STB 111 has also reserved the bandwidth for a scheduled recording. If another STB 111 has also requested bandwidth for the same programming content, the content platform 103 can maintain the allocation.

Accordingly STB 111 may comprise computing hardware (such as described with respect to FIG. 7) and include additional components configured to provide specialized services related to the reception and recording dynamically allocated programming content (e.g., recording functions, bandwidth allocation functions, remote control capabilities, conditional access functions, tuning functions, presentation functions, multiple network interfaces, audio/video signal ports, etc.). Alternatively, the functions and operations of STB 111 may be governed by a controller 207 that interacts with each of the STB components to initiate requests for a dynamic bandwidth allocation for recording dynamically allocated programming content. In turn, the user may be afforded greater functionality utilizing a control device 209 to control the recording manager services, as will be more fully described below.

As such, STB 111 may be configured to process requests for recording dynamically allocated programming content streams (e.g., streams 211*a*-211*c*), including causing the recording manager application 119*a* and dynamically allocated media content referenced therein (e.g., video component 213 and/or an audio component) to be presented on (or at) display 215. Presentation of recording functions and/or recordings of dynamically allocated programming content and related control signaling may include: displaying, recording, playing, rewinding, forwarding, toggling, selecting, zooming, or any other processing technique that enables users to request bandwidth allocation for recording a dynamically allocated program and then to view the recording of the content streams 211*a*-211*c* at a future time. For instance, STB 111 may provide one or more signals 217 to a display 215 (e.g., television) so that the display 215 may present (e.g., display) a user interface of the recording manager 119*a* as an overlay on the currently selected programming content (e.g., video 213).

STB 111 also interacts with DVR 219 to record received content (e.g., previously scheduled and dynamically allocated programming content) that can then be viewed or manipulated by a user at a later point in time. In various embodiments, DVR 219 may be network-based, e.g., included as a part of the service provider network 101, collocated at a subscriber site having connectivity to STB 111, and/or integrated into STB 111. A display 215 may present dynamical bandwidth allocation information and related content provided via STB 111 to a user. In alternative embodiments, STB 111 may be configured to communicate with a number of additional peripheral devices, including: a PC 221, laptops, PDAs, cellular phones, monitors, mobile devices, handheld devices, as well as any other equivalent technology capable of presenting dynamic bandwidth allocation information and related programming content to a user, such as those computing, telephony, and mobile apparatuses described with respect to FIG. 1.

These peripherals may be configured to implement instances of the recording manager 119 to access dynamic bandwidth allocation information and related content stored and/or processed by STB 111. For example, a dynamically allocated programming content stream 211*a* may be received by STB 111 and recorded by DVR 219, wherein PC 221 may later access and view the stored content. As discussed previously, requesting and confirming the allocation or reservation of bandwidth ensures that the content platform 103 will make the bandwidth available to support the recording. Moreover, the peripheral devices may be configured to program or otherwise control the functions of STB 111. For instance, the recording manager 119*b* executed on PC 221 may receive input from a user specifying the scheduling of a recording of a dynamically allocated program. The recording manager 119*b* of the PC 221 may then communicate with the content platform 103 to reserve bandwidth for transmitting the requested program at the scheduled time, wherein the STB 111 may receive the requested a programming content stream 211*b* for recording based on the interaction between the PC 221 and the content platform 103.

In another embodiment, user input to STB 111 and/or a peripheral device (e.g., PC 221) executing an instance of the recording manager (e.g., recording manager 119*a* and/or 119*b*) may cause the dynamically allocated programming content to be recorded and/or stored on another STB (e.g., STB 111*b*-111*n*) or a computing, telephony, or mobile device capable of recording video and/or audio streams from the content platform 103. Still further, user input to a network-based recording manager 119*c*, implemented on, for instance, server 223, may be used to initiate a bandwidth allocation request and corresponding scheduling of a recording of the programming content transmitted using the allocated bandwidth on the STB 111. For instance, a user may access recording manager 119c via an end terminal 113 (e.g., PC 221, a mobile handset, etc.), over one or more data networks (e.g., network 101, 105, and/or 117), to locate, specify, share, transmit, and/or record dynamically allocated programming content on the STB 111. In this manner, the content platform 103 or another content provider (e.g., televisions broadcasts systems 105 and content provider systems 107) with connectivity to the service provider network 101 may, when suitable, dynamically allocate bandwidth for transmitting a requested program for recording at a scheduled future on the STB 111.

Furthermore, STB 111 may include a communication interface 225 configured to request bandwidth reservations and receive dynamically allocated content streams from the content platform 103 or other programming content source. Communication interface 225 may optionally include single or multiple port interfaces. For example, STB 111 may establish a broadband connection to multiple sources transmitting content to STB 111 via a single port, whereas in alternative embodiments, multiple ports may be assigned to the one or more sources. In still other embodiments, communication interface 225 may be configured to permit users, via STB 111, to transmit data (including media content) to other users with STBs 111, the content platform 103, or other content source/sink. The communication interface 225 also includes components and/or circuitry for receiving programming content transmitted using dynamic bandwidth allocation technologies (e.g., IPTV, SDV). For example, to receive programming content using SDV, the communication interface 225 may include a tuning adapter to correlate a transmitted content stream with appropriate programming channel information. More specifically, the tuning adapter can decode and map a selected programming channel by matching the channel as transmitted on an available or dynamically physical carrier channel (e.g., a QAM carrier channel) with the corresponding programming channel identifier. By way of example, the content platform 103 receives a request to view a sports channel, which has been configured as a dynamically allocated channel. The content platform 103 determines that sub-channel 2 of QAM carrier channel 1 is available to transmit the sports channel, and dedicates the subchannel for transmitting the sports channel. The content platform 103 enters the bandwidth allocation into a mapping table, which is shared with the tuning adapter of the requesting STB 111. In this way, the tuning adapter can identify that the requested dynamically allocated channel (e.g., a sports channel) can be received by tuning to the subchannel (e.g., subchannel 2 of QAM carrier channel 1) specified in the mapping table.

According to various embodiments, STB 111 may also include inputs/outputs (e.g., connectors 227) to display 215 and DVR 219, as well as an audio system 229. In particular, audio system 229 may comprise a conventional audio-video receiver capable of monaural or stereo sound, as well as multichannel surround sound. Audio system 229 may include speakers, ear buds, headphones, or any other suitable component configured for personal or public dissemination. As such, STB 111, display 215, DVR 219, and audio system 229, for example, may support high resolution audio and/or video streams, such as high definition television (HDTV) or digital theater systems high definition (DTS-HD) audio. Thus, STB 111 may be configured to encapsulate data into a proper format with required credentials before transmitting onto one or more of the networks of FIG. 1 and de-encapsulate incoming traffic to dispatch data to display 215 and/or audio system 229.

In an exemplary embodiment, display 215 and/or audio system 229 may be configured with internet protocol (IP) capability (i.e., includes an IP stack, or is otherwise network addressable), such that the functions of STB 111 may be assumed by display 215 and/or audio system 229. In this manner, an IP ready, HDTV display or DTS-HD audio system may be directly connected to one or more service provider networks 101, packet-based networks 105, and/or telephony networks 117. Although STB 111, display 215, DVR 219, and audio system 229 are shown separately, it is contemplated that these components may be integrated into a single component, or other combination of components.

An authentication module 233 may be provided at STB 111 to initiate or respond to authentication schemes of, for instance, the content platform 103, the service provider network 101, or various other content providers, e.g., broadcast television systems 105, third-party content provider systems 107, or servers 223. Authentication module 233 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 111 may identify and authenticate a second device (e.g., PC 221) communicatively coupled to, or associated with, STB 111, or vice versa. Further, authentication information may be stored locally at memory 231, in a repository (not shown) connected to STB 111, or at a remote repository, e.g., user profile repository 121.

Authentication module 233 may also facilitate the reception of data from single or disparate sources. For instance, STB 111 may receive broadcast video from a first source (e.g., content platform 103), signals from a recording manager 119 at second source (e.g., server 223), and a programming content stream from a third source accessible over the data network 105 (e.g., content repository 109). As such, display 215 may present the broadcast video, recording manager 119, and recorded programming content stream to the user. This presentation may be experienced separately, concurrently, in a toggled fashion, or with zooming, maximizing, minimizing, or trick capabilities, or equivalent mode. In other exemplary embodiments, authentication module 233 can authenticate a user to allow them to specify a personalized programming guide and related content that is to be presented to other STBs (e.g., STB 111a-111n).

A presentation module 235 may be configured to receive data streams 211a-211c (e.g., audio/video feed(s) including dynamic bandwidth allocation information and related content retrieved over the service provider network 101) and output a result via one or more connectors 227 to display 215 and/or audio system 229. In this manner, presentation module 235 may also provide a user interface for the recording manager 119a via display 215. Aural aspects of the recording manager 119a (e.g., audible alerts and cues) may be presented via audio system 229 and/or display 215. In certain embodiments, the recording manager 119a may be overlaid on the video content output 213 of display 215 via presentation module 235.

Connector(s) 227 may provide various physical interfaces to display 215, audio system 229, as well as other peripherals; the physical interfaces may include, for example, RJ45, RJ11, high definition multimedia interface (HDMI), optical, coax, FireWire, wireless, and universal serial bus (USB), or any other suitable connector. The presentation module 235 may also interact with a control device 209 for determining particular media content that a user desires to experience and/or record. In an exemplary embodiment, the control device 209 may comprise a remote control (or other access device having control capability, such as a PC 221, wireless device, mobile phone, etc.) that provides a user with the ability to readily manipulate and dynamically change parameters affecting the recording manager 119 and related content being viewed and/or recorded. In other examples, STB 111 may be configured for voice recognition such that STB 111 may be controlled with spoken utterances.

In this manner, control device 209 may include (not shown) a cursor controller, trackball, touch screen, touch pad, keyboard, and/or a key pad for activating the recording manager 119a, navigating through the recording manager 119a, selecting programming content, as well as performing other control functions. For instance, control device 209 may be utilized to maximize an application implementing the recording manager 119, navigate through displayable interfaces, create/locate/specify/retrieve/record dynamically allocated programming content, or modify STB 111 parameters. Control device 209 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 209 may comprise a memory (not illustrated) for storing preferences affecting the recording of the bandwidth allocation and related programming related content that is being viewed and/or recorded, which can be conveyed to STB 111 through an input interface 237. The input interface 237 may support any type of wired and/or wireless link, e.g., infrared, radio frequency (RF), BLUETOOTH, and the like. Thus, control device 209 may store user preferences with respect to creating a personalized programming guide, such as favorite keywords, previous searches, recording history, programming preferences, etc. Alternatively, user preferences may be tracked, recorded, or stored in STB 111 or in a network user profile repository 121. The preferences may be automatically retrieved and activated by a user at any time. It is noted that the control device 209 may be separate from STB 111 or may be integrated within STB 111 (in which case certain input interface hardware and/or software may not be necessary).

Particular embodiments enable users, via control device 209, to populate or otherwise configure a user profile. For instance, a user profile application may be provided or accessed by STB 111 to enable users to populate a plurality of entry fields with user information. A user profile may include one or more customized or personalized settings that affect any aspect of requesting a bandwidth allocation for recording dynamically allocated programming content via the STB 111. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible programming content sources/subjects, a "blacklist" specifying one or more programming content sources/subjects, as well as other equivalent customized settings, such as color schemes, sound effects, etc.

In other embodiments, the user profile may be established using the additional access devices described earlier, e.g., the terminal 113, such as PC 221. As such, user profile information may be stored in STB 111, e.g., in memory 231, and/or at a user site repository (not illustrated) directly connected to STB 111. Additionally or alternatively, profile information may be stored in a network-based repository (e.g., remote user profile repository 121), control device 209, and/or any other storage medium. Similarly, STB 111 (via memory 231), a user site repository, and/or a network-based repository may store a "MY CONTENT" collection of recorded programming content accumulated by a user. This collection may include recordings of dynamically allocated programming content which may be accessed at any time by the user.

Figure 2B:
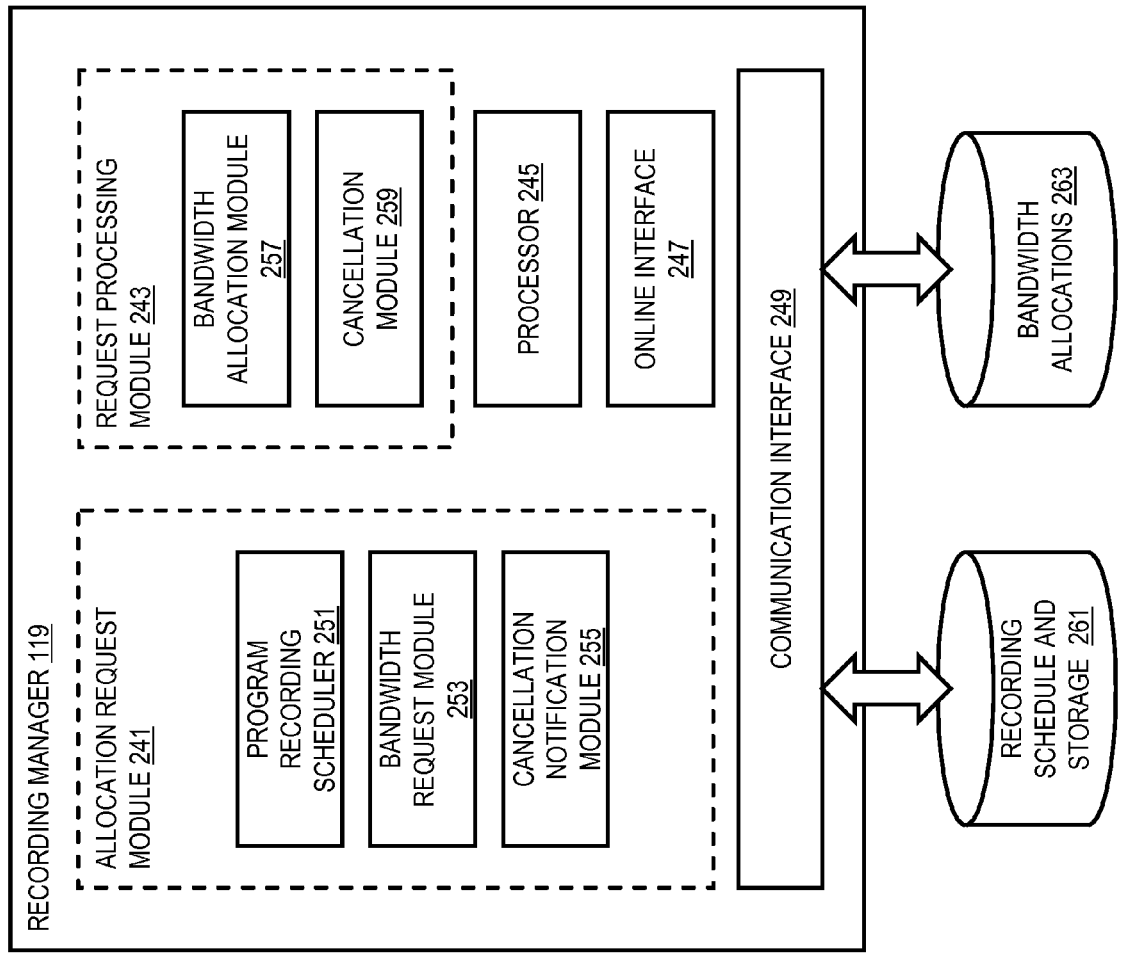
FIG. 2B is a diagram of the components of a recording manager, according to an exemplary embodiment.

FIG. 2B is a diagram of the components of a recording manager, according to an exemplary embodiment. Recording manager 119 may comprise computing hardware (such as described with respect to FIG. 7), as well as include one or more components configured to execute the processes described herein for utilizing dynamic bandwidth allocation for media recording. In one implementation, the recording manager 119 includes two sub-modules: allocation request module 241 and request processing module 243. By way of example, when implemented in user equipment (e.g., STB 111, terminal 113), the allocation request module 241 of the recording manager 119 enables the user equipment to request and reserve bandwidth allocations for recording programs transmitted using dynamic bandwidth allocation technologies. When implemented in a content provider (e.g., content platform 103, television broadcast systems 106, content provider systems 107), the request processing module 243 of the recording manager 119 enables the content provider to determine whether a portion of the dynamically allocated bandwidth is available to transmit a requested program for recording by the requesting user equipment at the requested date and time. In this way, the content provider can dedicate or reserve bandwidth to ensure that the requested program can be transmitted at the scheduled date and time.

As shown in FIG. 2B, the allocation request module 241 includes a program recording scheduler 251, a bandwidth request module 253, and a cancellation notification module 255. In addition, the request processing module 243 includes a bandwidth allocation module 257 and a cancellation module 259. The recording manager 119 also includes a processor 245, online interface 247, and communication interface 249. The recording manager 119 may also communicate with one or more databases, such as a recording schedule and storage database 261 and a bandwidth allocations database 263, via the communication interface 249. While specific reference will be made to this particular implementation, it is also contemplated that the recording manager 119 may embody many forms and include multiple and/or alternative components. For example, it is contemplated that the components of the recording manager 119 may be combined, located in separate structures, or placed at separate locations.

In one embodiment, users may access the recording manager 119 (or the features and functionality provided thereby) via the STB 111, terminal 113, or similar devices. In addition or alternatively, the recording manager 119 may provide a user interface, e.g., web portal or other networked application, to permit user access to the features and functionality of the recording manager 119. According to certain embodiments, the online interface 247 may be configured to provide such access through a web browser or similar application (e.g., voice browser or interactive voice recognition system) for access via, for instance, the terminal 113.

According to exemplary embodiments, a user can request or schedule the recording of a program using the program recording scheduler 251 of the allocation request module 241. In one embodiment, the user may select to record any programming content (e.g., broadcast television, on-demand content, pay-per-view content, etc.) available over the service provider network 101. As discussed previously, some or all of the programming content available over the service provider network 101 may be transmitted using dynamic bandwidth allocation technologies. These technologies enable the service provider (e.g., the content platform 103) to optimize available bandwidth to provide a larger selection of programming choices. However, because there is still only a finite amount of bandwidth or spectrum, the possibility exists that content platform 103 cannot transmit a requested programming content or channel if the number of requested programming channels exceed bandwidth limits. Accordingly, the scheduler 251 may verify the availability of the selected program by, for instance, determining whether the program is transmitted using dynamic bandwidth allocation technology. Based on this determination, the scheduler 251 interacts with the bandwidth request module 253 to initiate a request to the content platform 103 (e.g., the request processing module 243 of the content platform 103) to reserve a portion of the dynamically allocated bandwidth available over the service provider network 101 for transmitting the requested program for recording at the scheduled date and time. If the bandwidth request module 253 does not receive the requested bandwidth allocation or the bandwidth is otherwise unavailable, the scheduler 251 may suggest alternate channels, dates, and/or times for recording the requested programming content.

Once a recording is scheduled and the content platform 103 has allocated the requested bandwidth, the scheduler 251 may store a record of the planned recording in the recording schedule and storage database 261. In one embodiment, the database 261 may also be used to store the actual recordings. After the scheduling of a recording is complete, it is also recognized that a user may want to modify or cancel a scheduled recording. In this case, the scheduler 251 interacts with the cancellation notification module 259 to, for instance, notify the request processing module 243 of a change in or cancellation of the scheduled recording. In this way, the request processing module 243 can determine whether to release the previously allocated bandwidth for transmitting the changed or cancelled programming.

As shown in FIG. 2B, the request processing module 243 includes two components (i.e., the bandwidth allocation module 257 and the cancellation module 259 for responding to bandwidth allocation requests for recording dynamically allocated programming content. By way of example, the bandwidth allocation module 257 receives requests from the allocation request module 241 such requests. To respond to a request, the bandwidth allocation module 257 may review existing allocations stored in the bandwidth allocations database 263. The bandwidth allocations database 263, for instance, contains records all bandwidth that has already been reserved or allocated in response to other requests. Based on its evaluation existing allocations and other current loads on the service provider network 101 (e.g., linear broadcasts, on-demand programming requests, etc.), the bandwidth allocation module can generate and transmit a message to the allocation request module 241 to indicate whether the requested bandwidth is available.

As described above, the cancellation notification module 255 may send a notification to the request processing module 243 notifying the module 243 that a program previously scheduled using the process described herein has been cancelled or modified. The cancellation module 259 of the request processing module 243 receives this notification and determines whether the dynamically allocated bandwidth dedicated or reserved for transmitting the modified or cancelled programming should be made available for other transmissions. In one embodiment, the cancellation module 259 consults the bandwidth allocations database 263 to determine whether other users have requested the same allocation. If no other user has requested the same allocation, the cancellation module 259 may deallocate the reserved bandwidth.

It is also contemplated that the aforementioned web portal (or networked application) provided by (or accessed through) online interface 247, can be utilized to initiate or perform one or more functions of the recording manager 119. Online access via the module 209 can be useful when the user would like to initiate bandwidth allocation requests for recording dynamically allocated media content from a device other than the STB 111. For example, the user may access the functions of the recording manager 119 using a personal computer (e.g., terminal 113).

Accordingly, to provide selective access to the features and functionality of the dynamic bandwidth allocation recording service (or functionality) of system 100, the recording manager 119 may also include an authentication module (not illustrated) for authenticating (or authorizing) users of the service. It is contemplated that the authentication module may operate in concert with communication interface 249 and/or online interface 247. That is, the authentication module may verify user provided credential information acquired via communication interface 249 or online interface 247 against corresponding credential information stored within a user profile of user profiles database 121. By way of example, the credential information may include "log on" information corresponding to a user name, password, coded key, or other unique identification parameter, such a personal identification number (PIN). In other embodiments, the credential information may include any one, or combination of, a birth date, an account number (e.g., bank, credit card, billing code, etc.), a social security number (SSN), an address (e.g., work, home, IP, media access control (MAC), etc.), or telephone listing (e.g., work, home, cellular, etc.), as well as any other form of uniquely identifiable datum, e.g., biometric code, voice print, etc. Users may provide this information via the STB 111 or similar client device, such as by direct entry, spoken utterances, dual-tone multi-frequency signals (DTMF), packetized transmission, or other suitable method. Unobtrusive security may be provided by positively identifying and screening users based on one or more of the aforementioned credentials that may be seamlessly provided when the STB 111 communicates with the content platform 103, such as a unique IP or MAC address. Other unobtrusive measures can be made available via user specific voice prints, etc.

Additionally, the recording manager 119 may include one or more processors (or controllers) 245 for effectuating the dynamic bandwidth allocation recording service, as well as one or more memories (not shown) for permanent or temporary storage of one or more of the previously described control commands, parameters, recordings, user selections, user profile information, variables, etc.

Thus, under arrangements of FIGS. 1, 2A, and 2B, a user may reserve bandwidth for recording programming content or channels, and then manage or update those dynamic allocations if a recording is updated or cancelled.

Figure 3A:
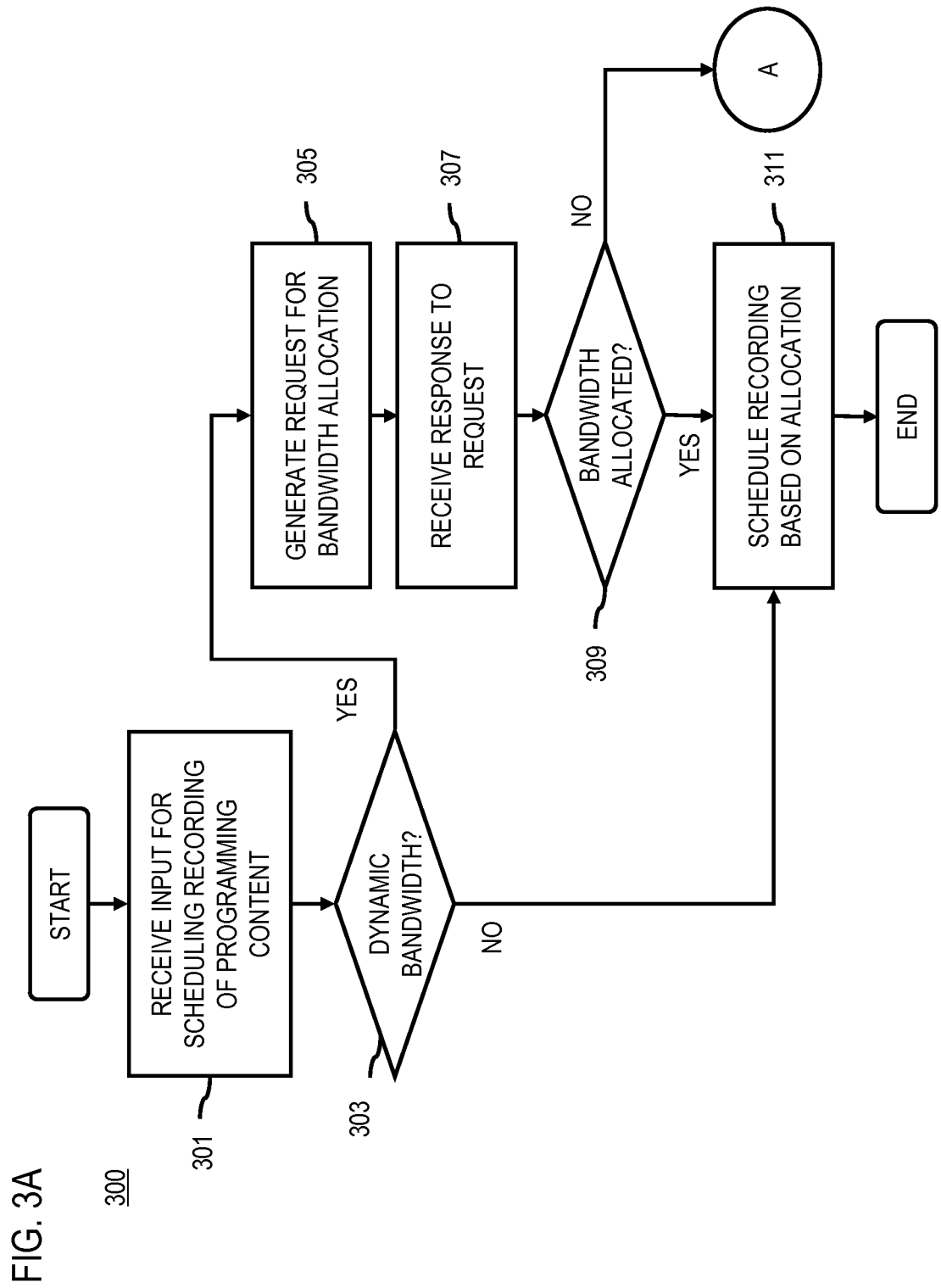
FIGS. 3A and 3B are flowcharts of a process for initiating a request a future recording of programming content provided using dynamic bandwidth allocation, according to various exemplary embodiments.
Figure 3B:
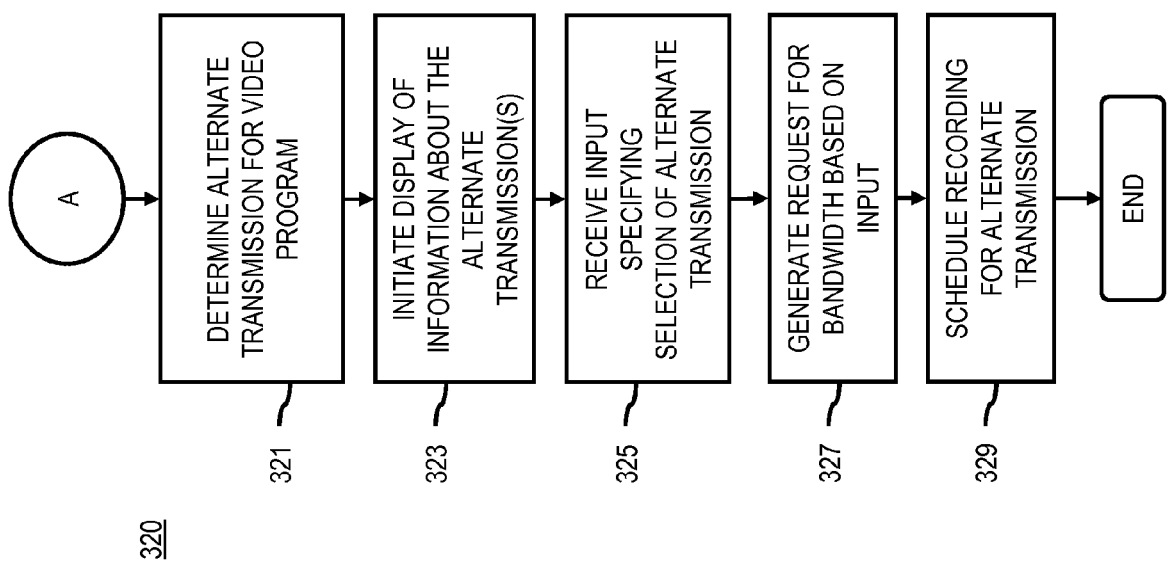

FIGS. 3A and 3B are flowcharts of a process for initiating a request a future recording of programming content provided using dynamic bandwidth allocation, according to various exemplary embodiments. In one embodiment, the process 300 of FIG. 3A and the process 320 of FIG. 3B are performed by one or more recording managers 119a-119n. At step 301, the recording manager 119 receives input for scheduling the recording of programming content (e.g., video content, video programs, television broadcasts, audio, etc.) available over the service provider network 101. For example, the recording may be of a video program or content scheduled for transmission at a future date and time. In one embodiment, the user may specify the input via the STB 111 using control device 209. By way of example, the STB 111 can display a programming guide listing available programming choices for the user to browse. The user can then select the programming content from the guide to provide the input. In another example, the user can conduct a search (e.g., a keyword search) to identify and select desired programming for recording. The user may also specify other criteria such as recommendations, history of the user's recordings or viewing habits, programming type, or a combination thereof to identify programs to record. In exemplary embodiments, the input includes a name or identifier associated with the programming content, the channel on which the content is transmitted, and the date and time scheduled for transmitting the content.

Next, the recording manager 119 determines whether the programming content specified in the input is transmitted over the service provider network 101 using a dynamic bandwidth allocation technology (step 303). For example, the recording manager 119 can make this determination by searching a table of channels (e.g., maintained by either the content platform 103 or the service provider network 101) for the channel corresponding to the requested programming content. In one embodiment, the table of channels is maintained by either the content platform 103 or the service provider network 101 when the content platform 103 or service provider network 101 employs dynamic bandwidth allocation technology for transmitting one or more of its channels. By way of example, the table of channels list all channels provided over the service provider network 101 and corresponding indications of which of those channels are provided using dynamic bandwidth allocation. It is also contemplated that the recording manager 119 can use any other mechanisms to determine whether a channel is dynamically allocated (e.g., querying the content platform 103 and/or the service provider network 101).

If the channel of the requested programming content is provided using dynamic bandwidth allocation, the recording manager 119 generates a request to, for instance, the content platform 103 to allocate or reserve a portion of the dynamically allocated bandwidth for transmitting the requested programming content at the scheduled date and time for the future recording. Like the recording request, the allocation request may include the name or identifier of the requested programming content, the channel of the content, and the date and time of the content. In exemplary embodiments, the content platform 103 processes the allocation request and provides a response granting or denying the bandwidth allocation or reservation. The recording manager 119 receives the response to the request (step 307) and reviews whether the requested bandwidth has been allocated (step 309). By way of example, allocation or reservation of the bandwidth ensures that the bandwidth will be available to transmit the requested program at the requested date and time. This avoids the potential that the program will be recorded because dynamic bandwidth is not available to transmit the program. If the bandwidth has been allocated or reserved, the recording manager 119 schedules the requested recording of the programming content at the specified date and time using the reserved dynamic bandwidth allocation (step 311). Once recorded, the recording can be stored in, for instance, the recording schedule and storage database 261. The recording manager 119 will also schedule the recording of the requested program if it has been determined that the requested program is not transmitted on a dynamically allocated programming channel.

If the bandwidth is not allocated (e.g., because bandwidth is not available at the requested date and time), the recording manager 119 performs the process 320 of FIG. 3B. At step 321 of FIG. 3B, the recording manager 119 determines whether there is one or more alternate transmissions (e.g., on alternate channels or at alternate schedule (e.g., date and time)) of the requested programming content. For example, the recording manager 119 can search a programming guide database (not pictured) associated with the content platform 103 for other showings or transmissions of the programming content. The alternate transmissions may occur on a different channel and/or at a different date and time. By selecting an alternate transmission, the recording manager 119 may be able to reserve bandwidth even when no bandwidth is available at the originally schedule channel, date, and time. If alternate transmissions are available, the recording manager 119 can then present or display the alternate choices to the user via, for instance, the STB 111 (step 323). By way of example, the choices may be displayed as a list. In addition or alternatively, the choices may be highlighted in a programming guide display. It is contemplated that the choices may be displayed and/or highlighted for the user using any mechanism available to the STB 111 (e.g., audio cues or alerts, pop-up windows, text boxes, etc.).

After reviewing the choices, the user may select one of the alternate choices or may cancel the recording process altogether. In turn, the recording manager 119 receives the input from the user for selecting one of the alternates (step 325). The user may indicate a selection using the mechanism (e.g., selecting the option via control device 209 of the STB 111) described with respect to initiating the request to record a program described above with respect to step 301 of FIG. 3A. Based on this input, the recording manager 119 generates another request for bandwidth to, for instance, the content platform 103 for recording the alternate transmission—i.e., the programming content at the alternate channel, date, or time (step 327). If the content platform 103 responds that bandwidth is available, the recording manager 119 schedules the future recording based on the dynamic bandwidth allocation at the alternate channel, date, or time (step 329). The process 320 may be repeated until the available alternate transmissions are exhausted or the dynamic bandwidth allocation is reserved. In certain embodiments, the recording manager 119 may verify the availability of bandwidth to support the various determined alternates before presenting the alternate transmissions to the user. In this way, the recording manager 119 can present only those options for which dynamic bandwidth allocation is available.

Figure 4:
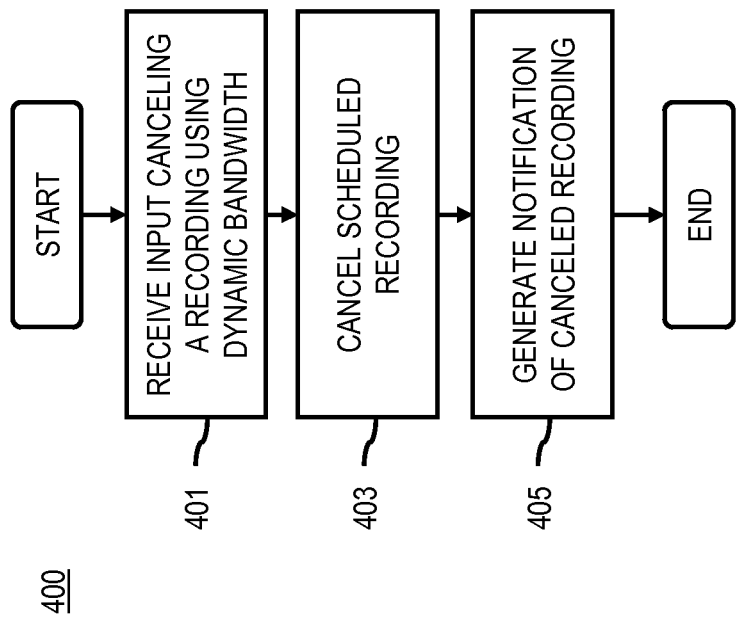
FIG. 4 is a flowchart of a process for cancelling a scheduled recording of programming content provided using dynamic bandwidth allocation, according to an exemplary embodiment.

FIG. 4 is a flowchart of a process for cancelling a scheduled recording of programming content provided using dynamic bandwidth allocation, according to an exemplary embodiment. In one embodiment, the process 400 of FIG. 4 is performed by the recording manager 119. At step 401, the recording manager 119 receives input for canceling a previously scheduled recording of programming content that is delivered using dynamic bandwidth allocation. In this example, it is assumed that the recording manager has already requested and received a dynamic bandwidth allocation to support the recording. Moreover, the request to cancel the recording may be received any time after the recording is scheduled and before the completion of the recording. By way of example, the cancellation request can be initiated at the STB 111 using the control device 209. More specifically, the control device 209 can be used to select a "cancel recording" menu option or command. In addition or alternatively, the control device 209 may provide a separate physical key or combination of keys to activate the recording cancellation option.

On receiving a cancellation command, the recording manager 119 cancels the scheduled recording by, for instance, removing the canceled recording from the recording schedule and storage database 261 (step 403). Removal of the canceled recording from the database 261 effectively removes it from the schedule of future recordings. On cancellation of the recording, the recording manager 119 also generates a notification that the recording has been cancelled and that the dynamic bandwidth allocation is no longer needed by the requesting recording manager 119 (step 405). In one embodiment, the notification is automatically transmitted to the content platform 103 to alert the platform 103 of the change. In some embodiments, a change in the recording schedule (e.g., when changing the channel, date, and/or time associated with the programming content to record) can also trigger the cancellation notification because these types of changes have the potential to affect the dynamic bandwidth allocation. In other words, changing the channel, date, and/or time of the recording alters the key parameters used for granting the dynamic bandwidth. Therefore, any change in one of the three parameters (i.e., channel, date, and/or time) is an effective cancellation of the original request and the initiation of a new request with the new programming parameters.

Figure 5:
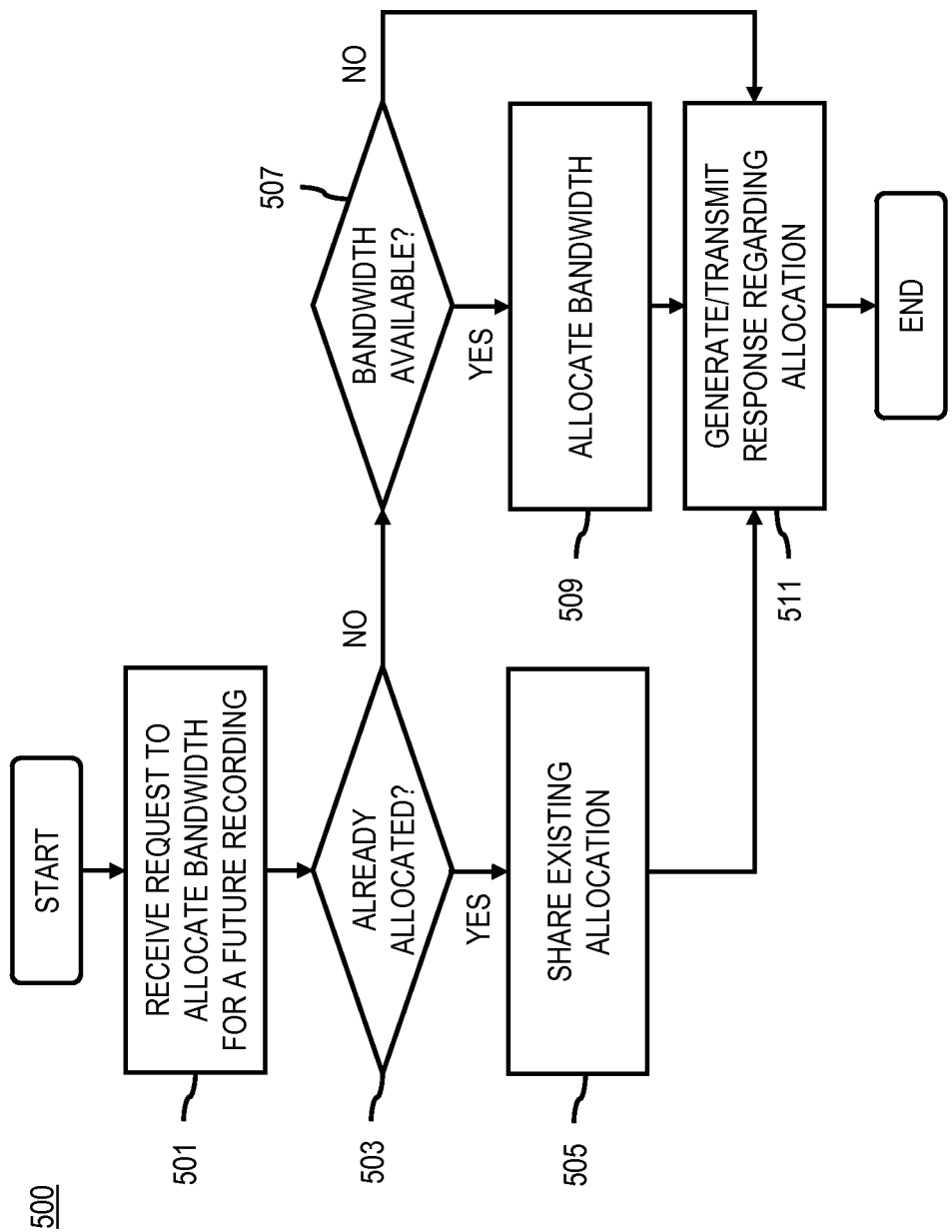
FIG. 5 is a flowchart of a process for dynamically allocating bandwidth in response to a request to record programming content provided using dynamic bandwidth allocation, according to an exemplary embodiment.

FIG. 5 is a flowchart of a process for dynamically allocating bandwidth in response to a request to record programming content provided using dynamic bandwidth allocation, according to an exemplary embodiment. In one embodiment, the process 500 of FIG. 5 is performed by the recording manager 119. At step 501, the recording manager 119 receives a request for a dynamic bandwidth allocation for a future recording of programming content (e.g., video programs, television broadcasts, etc.). By way of example, the request can be received from another instance of the recording manager 119 operating in the STB 111 over the service provider network 101. The request includes, for instance, a name or identifier of the requested programming content as well as the channel, date, and time of the content. Based on the programming information included in the request, the recording manager 119 can determine whether a dynamic bandwidth allocation has already been allocated or reserved to transmitting the same program to another STB 111. For example, the allocation may have already been made in response to a previous request from the other STB 111 to record the same program. In exemplary embodiments, the same dynamic bandwidth allocation can be used to transmit the same program to all STBs 111 requesting that program. Accordingly, if a dynamic bandwidth allocation has already been reserved for the requested program, the recording manager 119 can share the existing dynamic bandwidth allocation request to satisfy the new request (step 505). In other words, the recording manager 119 need not allocate or reserve additional bandwidth if bandwidth has already be reserved for transmitting the requested program to at least one other STB 111.

If no dynamic bandwidth allocation has been previously allocated, the recording manager 119 determines whether there is dynamically allocated bandwidth available to transmit the programming content at the date and time of the requested recording (step 507). In one embodiment, the recording manager 119 makes this determination by comparing the total available bandwidth against the anticipated network load at the requested time. This network load can include, for instance, transmissions of linear broadcasts and well as other previously scheduled dynamic broadcasts. By way of example, the recording manager 119 can determine network load by consulting information contained in the recording schedule and storage database 261 and the bandwidth allocations database 263. In certain embodiments, the content platform 103, content provider, service provider, network operator, or a combination thereof may set a limit on the total amount of bandwidth available over the service provider network 101 that can be reserved or allocated for future recordings. In this way, the service provider network 101 can avoid committing all available dynamically allocated bandwidth for future recordings if demand for such resources reaches a high level. For example, committing all or a large portion of the total available dynamically bandwidth can prevent the content platform 103 from providing bandwidth for present requests for programming content delivered using dynamic bandwidth allocation technology. If the total bandwidth limitation is in effect and allocating the dynamic bandwidth would exceed the limitation, the recording manager 119 may determine that the requested bandwidth is not available and will not make the bandwidth reservation.

If the bandwidth is available, the recording manager 119 reserves or allocates the dynamic bandwidth allocation for transmitting the requested programming content to enable the future recording (step 509). For example, to reserve the dynamically allocated bandwidth, the recording manager creates an entry in the bandwidth allocations database 263 describing the name or identifier of the programming content along with the corresponding channel, date, and time. After determining whether the bandwidth is available and reserving the bandwidth if the bandwidth is available, the recording manager 119 generates and transmits a response to the requesting STB 111 to either confirm or deny the bandwidth allocation or to otherwise indicate the disposition of the dynamic bandwidth allocation request (step 511). A positive response regarding the allocation request indicates to the STB 111, for instance, that the requested dynamically allocated bandwidth will be available to the STB 111 at the scheduled date and time of the future recording.

Figure 6:
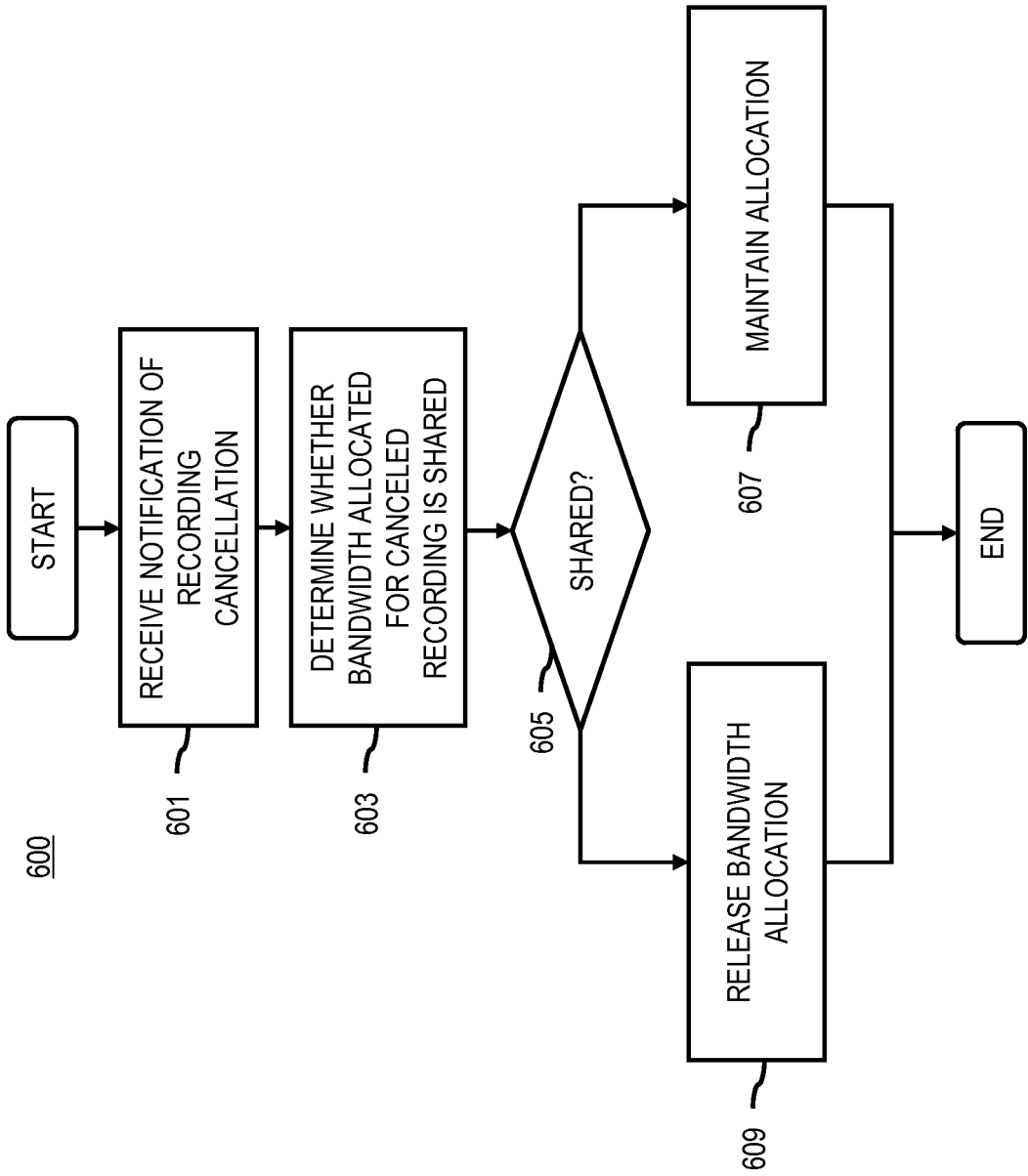
FIG. 6 is a flowchart of a process for releasing bandwidth in response to a notification of a recording cancellation, according to an exemplary embodiment.

FIG. 6 is a flowchart of a process for releasing bandwidth in response to a notification of a recording cancellation, according to an exemplary embodiment. In one embodiment, the process 600 of FIG. 6 is performed by the recording manager 119. At step 601, the recording manager 119 receives a notification from the STB 111 that a recording previously scheduled on the STB 111 has been cancelled. In the example of FIG. 6, the canceled recording is associated with a previously reserved dynamic bandwidth allocation. In response to the notification, the recording manager 119 evaluates whether the dynamic bandwidth allocation associated with the canceled recording can unallocated. Once unallocated, the reserved bandwidth can be used to transmit other programming content over the service provider network 101. To perform this evaluation, the recording manager 119, for instance, determines whether the dynamic bandwidth allocated for the canceled recording is shared with other STBs 111 (steps 603 and 605).

As described earlier, STBs 111 that request the same program can share the same dynamic bandwidth allocation because the bandwidth is used to transmit the program to all STBs 111 viewing the program over the service provider network 101. Therefore, if the bandwidth is shared among multiple STBs 111, the bandwidth associated with a canceled recording is no longer needed only with respect to the STB 111 that canceled the recording. Other STBs 111 that share the bandwidth and have made no such cancellation still have need for the reserved bandwidth. In this case, the recording manager 119 maintains the dynamic bandwidth allocation so that the other remaining STBs 111 that have not canceled their recordings of the programming content still have the dynamic bandwidth allocation (step 607). If the recording manager 119 determines that the bandwidth is not shared or that all other STBs 111 that share the bandwidth have also canceled their respective recordings of the programming content, the recording manager may release (or deallocate), per step 609, the previously reserved dynamic bandwidth allocation. The released bandwidth is then, for instance, placed in the pool of available dynamically allocated bandwidth from which the recording manager 119 can draw to support other dynamic bandwidth allocation requests.

One of ordinary skill in the art would recognize that the processes described above may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 7:
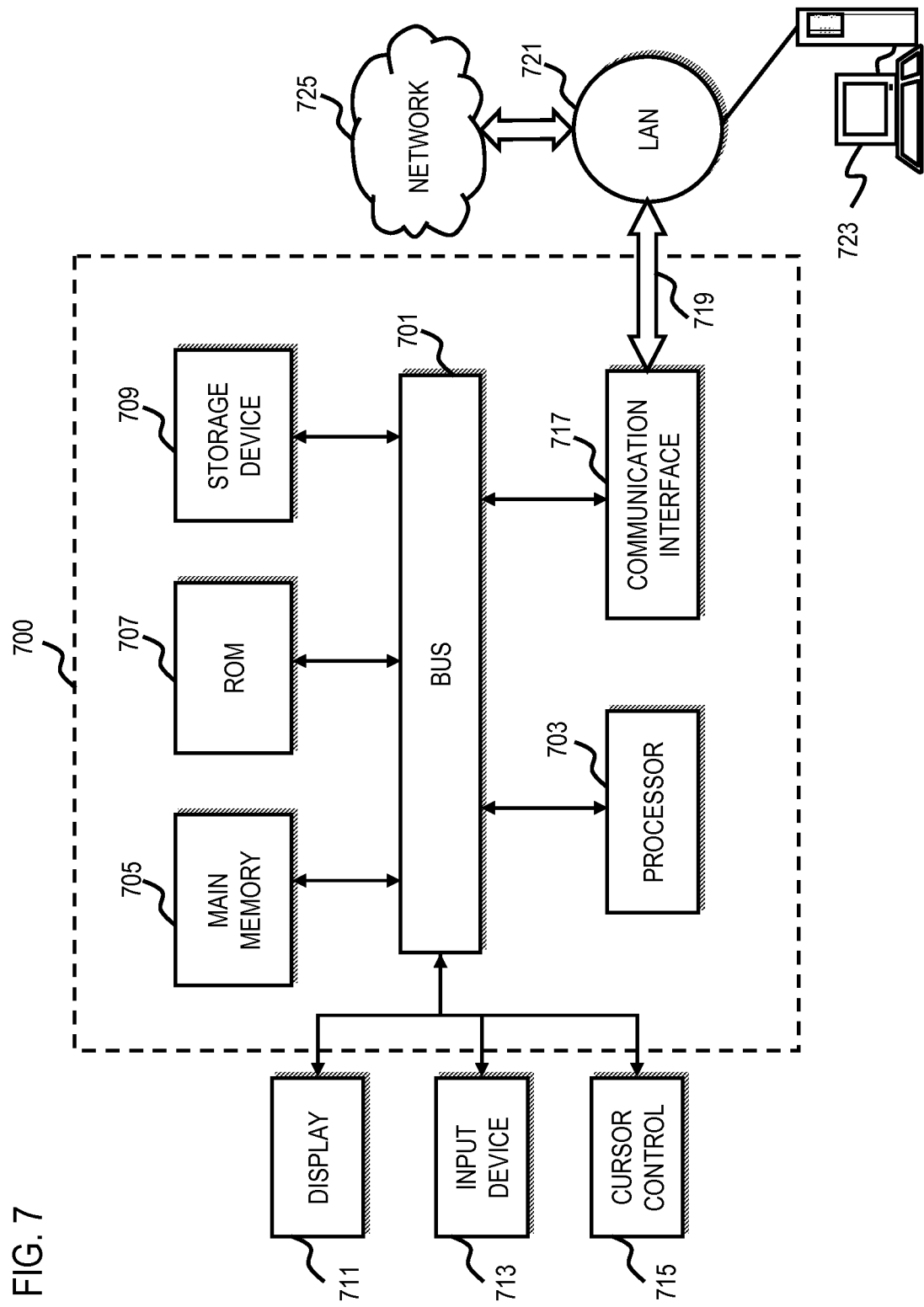
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    generating a request for bandwidth for a future recording of a programming content to be delivered to a set-top box at a user premise;
    selectively receiving a response to the request indicating a dynamic bandwidth allocation for the future recording of the programming content;
    scheduling the future recording of the programming content based on the dynamic bandwidth allocation;
    when no bandwidth allocation for the future recording of the programming content can be made, determining one of a plurality of alternate transmissions of the programming content generating a subsequent request for bandwidth for the future recording of the one of the plurality of alternate transmissions of the programming content, and continuing generating subsequent requests for bandwidth until bandwidth allocation can be made for the one of the plurality of alternate transmissions;
    receiving an input from a user for canceling the future recording;
    determining whether the dynamic bandwidth allocation for the canceled future recording is shared with at least one other set-top box;
    maintaining the dynamic bandwidth allocation when the determination is that the dynamic bandwidth allocation for the canceled future recording is shared with at least one other set-top box;
    canceling the dynamic bandwidth allocation when the determination is that the dynamic bandwidth allocation for the canceled future recording is not shared with at least one other set-top box; and
    generating a notification at the set-top box about the canceled future recording,
    wherein the request for bandwidth is generated at a wireless mobile device running a recording manager and transmitted via a packet based network to a service provider that allocates the dynamic bandwidth allocation, and
    wherein, when the programming content is delivered, the programming content is recorded and stored at the set-top box and at the wireless mobile device.

2. A method of claim 1, wherein the dynamic bandwidth allocation is provided using Internet protocol television (IPTV), switched digital video, or a combination thereof.

3. A method of claim 1, wherein the set-top box includes a digital video recorder (DVR) or a personal video recorder (PVR).

4. An apparatus comprising:
    a recording manager configured:
        to generate a request for bandwidth for a future recording of a programming content to be delivered to a set-top box at a user premise,
        to selectively receive a response to the request indicating a dynamic allocation of the bandwidth for the future recording,
        to schedule the future recording of the programming content based on the bandwidth allocation,
        when no bandwidth allocation for the future recording of the programming content can be made, to determine one of a plurality of alternate transmissions of the programming content, to generate a subsequent request for bandwidth for the future recording of the one of the plurality of alternate transmissions of the programming content, and to continue to generate subsequent requests for bandwidth until bandwidth allocation can be made for the one of the plurality of alternate transmissions;
        to receive an input from a user for canceling the future recording;
        to determine whether the dynamic bandwidth allocation for the canceled future recording is shared with at least one other set-top box;
        to maintain the dynamic bandwidth allocation when the determination is that the dynamic bandwidth allocation for the canceled future recording is shared with at least one other set-top box;
        to cancel the dynamic bandwidth allocation when the determination is that the dynamic bandwidth allocation for the canceled future recording is not shared with at least one other set-top box; and
        to generate a notification at the set-top box about the canceled future recording,
    wherein the recording manager is at a wireless mobile device and the request is transmitted via a packet based network to a service provider that allocates the dynamic bandwidth allocation, and
    wherein, when the programming content is delivered, the programming content is recorded and stored at the set-top box and at the wireless mobile device.

5. An apparatus of claim 4, wherein the dynamic bandwidth allocation is provided using Internet protocol television (IPTV), switched digital video, or a combination thereof.

6. An apparatus of claim 4, wherein the apparatus is included in the set-top box, a digital video recorder (DVR), or personal video recorder (PVR).

* * * * *